United States Patent [19]

Clarke et al.

[11] 4,370,429

[45] Jan. 25, 1983

[54] DISPERSING SOLID CARBONACEOUS MATERIAL IN WATER

[75] Inventors: John B. Clarke, Bradford; Leslie Pitts, Ilkley, both of England

[73] Assignee: Allied Colloids Limited, Bradford, England

[21] Appl. No.: 267,485

[22] Filed: May 27, 1981

[30] Foreign Application Priority Data

May 31, 1980 [GB] United Kingdom ............... 8017896

[51] Int. Cl.³ ............................................. C08K 3/20
[52] U.S. Cl. ......................................... 524/60; 524/61; 524/63; 524/69
[58] Field of Search .................. 260/28.5 AS, 29.6 R, 260/29.6 HN; 524/60, 61, 63, 69

[56] References Cited

U.S. PATENT DOCUMENTS 4,000,095 12/1976 Van Den Berg ............ 260/28.5 AS
4,045,380 8/1977 Blunt et al. .................. 260/28.5 AS

*Primary Examiner*—Melvyn J. Marquis
*Attorney, Agent, or Firm*—Lawrence Rosen

[57] ABSTRACT

Quaternized ammonium synthetic polymers having a solution viscosity, as measured on a 1% solution in deionized water at 25° C. using a suspended level viscometer of from 1 to 500 cs are used as dispersing agents in aqueous slurries of water and solid particulate carbonaceous material.

9 Claims, No Drawings

DISPERSING SOLID CARBONACEOUS MATERIAL IN WATER

The invention relates to the stabilisation of suspensions of pulverised coal or other solid carbonaceous material in water.

Combustion of pulverised coal dispersed in water has been shown to offer advantages over combustion of the "dry" fuel. That the dispersion is handleable as a liquid fuel is one obvious advantage. For efficient combustion the suspension must have a high proportion of coal to water and it is necessary to ensure that the coal particles do not agglomerate, which results in a thickening effect which may proceed to a point where the suspension is not pumpable. Accordingly there is a need for an efficient dispersing agent.

Coal has for many years been transported in pulverised form as an aqueous slurry, for example by pipeline, and here again an efficient dispersing agent would help to stabilise the suspension and ensure continued pumpability.

Over the years many substances have been proposed as dispersing agents for solid particulate inorganic materials. Commercially the dispersing agents that have been found to be successful have generally been monomeric surfactants, for instance alkylaryl sulphonates, naturally occurring viscosity regulators (including derivatives thereof) such as carboxymethyl cellulose, and certain synthetic polyelectrolytes. It has become well recognised that the molecular weight of the polyelectrolyte has a significant effect on the properties and in particular can influence whether the polyelectrolyte has dispersing properties or the precise opposite, namely flocculation properties. In general it has become recognised that the polyelectrolyte should be of low molecular weight, e.g. below 50,000, if successful dispersing properties are to be required but of high molecular weight, e.g. above 1 million, if successful flocculation properties are required. It has also become recognised that many cationic high molecular weight polyelectrolytes, especially quaternary ammonium high molecular weight polymers, are very effective flocculating agents.

It is an unfortunate fact that materials that are generally regarded as dispersing agents for inorganic particulate materials have not proved entirely satisfactory as dispersing agents for aqueous suspensions of solid particulate carbonaceous material. Various systems of making and handling such dispersions have been proposed in the literature.

In British Pat. No. 1,449,268 it is disclosed that the sodium carboxymethyl cellulose which is used as a grinding aid also acts as a suspending or viscosity aid.

In British Pat. No. 1,469,319 the bound water is removed from the coal before slurrying in water. An agglomeration inhibiting agent may be added and various types are suggested. Conventional surfactants such as alkylaryl sulphonates are proposed.

In British Pat. No. 1,522,575 it is proposed that ammonium hydroxide and an anionic surfactant be added to a coal slurry in water to give improved pumpability.

In French Pat. No. 2393053 impurities are separated from coal by forming a slurry of the impure coal in water containing a particular type of dispersing agent. The dispersing agent is one that by selective adsorption produces different charging of particles of carbon and impurity particles with the result that a dispersion of cleaned coal is produced. The dispersing agent gives some stabilisation of the dispersion but improved stability is still required. The disclosed dispersants are all low molecular weight anionic acrylate polymers or polyphosphates.

In European Patent Specification 8628 it is described how the use of certain specified water soluble polymers permits the transport of coal slurries of increased solids content. The defined polymers are selected from the group consisting of polyethylene oxide, polyacrylamide, hydroxyethyl cellulose, the quaternary nitrogen substituted cellulose ethers described in U.S. Pat. No. 4,018,729, xanthan gum, hydroxy propyl guar gum and carboxy methyl hydroxy propyl guar gum. Most of the examples use polyethylene oxide but one of the examples does use a quaternary nitrogen containing cellulose ether having a 1% aqueous solution viscosity of 1,000 to 2,500 cps at 25° C. The 1% aqueous solution viscosity of many of the polymers used in the examples is given and all the values fall within the range 1,000 to 4,500 cps at 25° C. except for a xanthan gum which is said to have a 1% aqueous solution viscosity of 850 cps at 25° C.

It has been our object to provide aqueous dispersions of solid particulate carbonaceous material using dispersing agents that are convenient to produce and yet which give very satisfactory stability to the dispersions.

An aqueous slurry according to the invention comprises solid particulate carbonaceous material, water and a stabilising amount of a dispersing agent that comprises a quaternary ammonium synthetic polymer made by polymerisation of ethylenically unsaturated monomer or monomers and that has a 1% solution viscosity, as measured using a suspended level viscometer in deionised water at 25° C., of from 1 to 500 cs.

The amount of dispersing agent present must be sufficient to produce stabilisation of the dispersion and so will depend partly upon the other components of the dispersion and in particular upon the amount of particulate carbonaceous material. Generally if too little dispersing agent is present then a stable dispersion is not obtained and the product is non-pourable. The amount is generally at least 0.01% and usually at least 0.1% although with some slurries this may be inadequate for optimum results. Most consistent results are obtained if the amount is at least 0.2%. The amount may be up to 1% or higher, for instance 2%, but generally there is no advantage in using more than 1%. All percentages are, unless otherwise specified, dry weight polymer based on dry weight of carbonaceous material. The optimum amount for any particular slurry can easily be found by routine experimentation.

The carbonaceous material may be coal, coke (e.g. petroleum coke) or other particulate carbonaceous solid or mixtures. The particulate material generally has a particle diameter less than 250 microns.

By the invention it is possible to obtain good stability in slurries containing, for instance, more than 60% solids.

The molecular weight of the polymer must be at least 100,000 and is generally at least 500,000, preferably in the range of about $10^6$ to about $10^7$. Preferred results are obtained with molecular weights of from about $2 \times 10^6$ to about $5 \times 10^6$, most preferably about $4 \times 10^6$.

The polymer should have a solution viscosity of 1 to 500 cs, especially 5 to 100 cs and most preferably 5 to 50 cs. Throughout this specification the solution viscosity is, unless otherwise specified, the viscosity of a 1% solution of the polymer in deionised water measured at 25° C. using a suspended level viscometer.

Although mention has been made in the literature that some high molecular weight synthetic polymers have dispersing properties in fact such polymers have primarily been used as efficient flocculants, the exact opposite of dispersions. It is therefore very surprising that very effective dispersion can be obtained with such polymers when they are used in dispersing or stabilising amounts and in particular it was very surprising that such polymers would produce more stable, lower viscosity suspensions than the recommended commercial dispersants.

The dispersing agents used in the invention not only have the advantage that they are capable of giving good dispersion properties in the aqueous slurries but also they are synthetic, and thus avoid the disadvantages incurred when using naturally occurring, or modified naturally occurring, polymers.

The quaternary ammonium group may be in the polymer chain or pendant to it. The polymer may be made by quaternising a preformed synthetic polymer or by polymerising one or more monomers including a quaternising group. Preferred polymers are based on acrylic or methacrylic monomers, including acrylamide and methacrylamide. The polymers are preferably linear.

The polymer is preferably a homopolymer but copolymers containing a major proportion, usually at least 80% molar, of units containing quaternary groups may be used. In particular it is preferred for the polymer to be a quaternised acrylate, methacrylate, acrylamide or methacrylamide polymer.

The recurring unit in the polymer is preferably selected from quaternised dialkylaminoalkyl acrylates, dialkylaminoalkyl methacrylates, dialkylaminoalkyl acrylamide and dialkylaminoalkyl methacrylamides. The last two may be made by aminoalkylation of an acrylamide or methacrylamide polymer. The alkyl groups in the dialkyl moiety are preferably each selected from $C_{1-3}$ L unsubstituted alkyl groups while the other alkyl group is preferably selected from $C_{1-3}$ unsubstituted or hydroxy substituted alkyl groups. Preferred dialkyl groups are dimethyl or diethyl, although different groups may be present. The other alkyl group is preferably methyl, ethyl, propyl or hydroxypropyl.

Examples of suitable homopolymers are those produced by polymerising dialkylaminoalkyl(meth) acrylates quaternised by methyl chloride or dimethyl sulphate. High molecular weight polyacrylamides may be aminomethylated and then quaternised to produce copolymers containing in excess of 60% molar of quaternary ammonium units. Diallyldimethylammonium chloride may be used as monomer.

The quaternising reagents are preferably methylchloride or dimethyl sulphate but any other suitable reagent may be used.

The polymers may be made by methods conventional for the production of quaternary ammonium polyelectrolytes formed from ethylenically unsaturated monomers.

The dispersions may be formed by adding a solution of the polymer to a fuel-water slurry or the solids may be added to an aqueous solution of the polymer.

We have also found that the stability of coal dispersions containing low molecular weight anionic polymers, which may have been added to assist grinding of the fuel or to assist separation of coal from mineral matter by selective dispersion, may be improved by adding the quaternary ammonium polymers of the invention.

The slurries of the invention are best utilised fairly soon after their preparation, for instance within two days, since the stability of the slurry may deteriorate with some polymers over extended periods of time, for instance if the slurry is to be stored for two or more days. However some polymers give very good storage stability. In particular polymers based on dialkylaminoalkyl acrylate and methacrylate are very useful, especially those based on dimethylamino ethylmethacrylate homopolymers quaternised with, preferably, methylchloride. Such polymers can give stability over 20 days storage.

EXAMPLES

A 65% by weight solids aqueous slurry was formed using a powdered Australian coal containing 16% mineral matter and size less than 250$\mu$. The coal was gradually added to an aqueous solution of polymer under test using a propeller stirrer at 2500 rpm.

The fluidity of the final slurry was measured using a Brookfield viscometer (RVT model at 20 rpm).

A range of quaternary ammonium polymers were tested against a low molecular weight (about 5,000) sodium polyacrylate commercial dispersant. The results are given in Table 1.

| Polyelectrolyte dose level % $\frac{dry}{dry}$ | Viscosity of slurry (65% solids) in cps | | | | |
|---|---|---|---|---|---|
| | Na poly-acrylate | Cat 1 | Cat 2 | Cat 3 | Cat 4 |
| 0.14 | non-pourable | 2600 | 9200 | Non-pourable | Non-pourable |
| 0.18 | non-pourable | 1000 | 9000 | Non-pourable | Non-pourable |
| 0.24 | non-pourable | 550 | 8500 | 1300 | 8000 |
| 0.30 | non-pourable | 550 | 9500 | 1000 | 9000 |

Cat 1 is a methyl chloride quaternised dimethylaminoethylmethacrylate homopolymer molecular weight approx. $10^6$ and 1% solution viscosity 6 cs.
Cat 2 is the same homopolymer but with MW approx. $4 \times 10^6$ and 1% solution viscosity 48 cs.
Cat 3 is a dimethyl sulphate quaternised diethylaminoethylacrylate homopolymer molecular weight about $10^6$ and 1% solution viscosity 26 cs.
Cat 4 is a dimethyl sulphate quaternised dimethylaminomethlacrylamide polymer MW about $2 \times 10^6$ and 1% solution viscosity 17.5 cs.

These results show that all of the quaternary ammonium polymers gave pumpable slurries at sufficient concentration and all were superior to the sodium polyacrylate dispersant.

A similar series of tests were carried out using a dispersion of petroleum coke particles having diameter below 250$\mu$ in water at 65% solids. The results are shown below.

| Polyelectrolyte dose level % $\frac{dry}{dry}$ | Viscosity of slurry in cps | | | | |
|---|---|---|---|---|---|
| | Cat 1 | Cat 2 | Cat 3 | Cat 4 | Na Poly-acrylate |
| 0.1 | np | np | np | np | np |
| 0.14 | np | np | np | np | np |
| 0.18 | >10,000 | >10,000 | np | np | np |
| 0.24 | 1100 | 8500 | 2000 | 9000 | np |
| 0.30 | 1000 | 9300 | 2500 | 9500 | np | np = non-pourable

It was found that the stability of the dispersion (coke or coal) depended on the quaternary ammonium polymer used. Cat 1 and 2 gave the best long term stability.

After 50 days, dispersions made using Cat 2 were still fluid.

What is claimed is:

1. An aqueous slurry comprising solid particulate carbonaceous material, water and a stabilising amount of a dispersing agent, characterised in that the carbonaceous material is coke or coal and the dispersing agent comprises a quaternary ammonium synthetic polymer made by polymerisation of ethylenically unsaturated monomer or monomers and having a solution viscosity, as measured using a suspended level viscometer on a 1% solution in deionised water at 25° C., of 1 to 500 cs.

2. A slurry according to claim 1 characterised in that the said solution viscosity is from 5 to 100 cs preferably 5 to 50 cs.

3. A slurry according to claim 1 characterised in that the polymer has a molecular weight of from $10^5$ to $10^7$.

4. A slurry according to claim 1 characterised in that the polymer has a molecular weight of from $10^6$ to $10^7$, preferably $2 \times 10^6$ to $5 \times 10^6$.

5. A slurry according to claim 1 characterised in that at least 80% molar of the units of the polymer are quaternised acrylate, methacrylate, acrylamide or methacrylamide units.

6. A slurry according to claim 1 characterised in that at least 80% molar of the units of the polymer are quaternised dialkylaminoalkyl acrylate, methacrylate, acrylamide or methacrylamide wherein the alkyl groups in the dialkyl moiety are each selected from $C_{1-3}$ unsubstituted alkyl groups and the other alkyl group is selected from $C_{1-3}$ unsubstituted or hydroxy substituted alkyl groups.

7. A slurry according to claim 1 characterised in that the amount of polymer is from 0.2 to 1% dry weight based on the dry weight of particulate carbonaceous material.

8. A slurry according to claim 1 characterised in that the dry weight of particulate carbonaceous material in the slurry is at least 60% by weight of the slurry.

9. In an aqueous slurry comprising solid particulate coke or coal, water and a stabilising amount of a dispersing agent, the improvement comprising using as dispersing agent a quaternary ammonium synthetic polymer of which 80% molar of the recurring units are selected from quaternised dialkylaminoalkyl acrylate, methacrylate, acrylamide and methacrylamide units and which has a molecular weight of from 500,000 to $10^7$ and which has a solution viscosity as measured on a 1% solution in deionised water at 25° C. using a suspended level viscometer of from 5 to 100 cs.

* * * * *